US008886266B2

(12) United States Patent
Shinzato et al.

(10) Patent No.: US 8,886,266 B2
(45) Date of Patent: Nov. 11, 2014

(54) SUPERCONDUCTING COIL, ROTATING DEVICE, AND SUPERCONDUCTING COIL MANUFACTURING METHOD

(75) Inventors: Tsuyoshi Shinzato, Osaka (JP); Hitoshi Oyama, Osaka (JP); Yutaka Komatsu, Osaka (JP); Takeshi Baba, Osaka (JP); Takeshi Ariyoshi, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/704,697

(22) PCT Filed: Jun. 21, 2010

(86) PCT No.: PCT/JP2010/060417
§ 371 (c)(1),
(2), (4) Date: Dec. 17, 2012

(87) PCT Pub. No.: WO2011/161743
PCT Pub. Date: Dec. 29, 2011

(65) Prior Publication Data
US 2013/0090244 A1    Apr. 11, 2013

(51) Int. Cl.
*H01F 6/06*        (2006.01)
*H02K 55/04*       (2006.01)
*H01L 39/24*       (2006.01)
*H01F 41/04*       (2006.01)
*H02K 3/18*        (2006.01)
*H02K 15/04*       (2006.01)

(52) U.S. Cl.
CPC .............. *H01F 6/06* (2013.01); *H01F 41/048* (2013.01); *H02K 3/18* (2013.01); *H02K 55/04* (2013.01); *Y02E 40/625* (2013.01); *H02K 15/045* (2013.01); *Y10S 505/877* (2013.01); *Y10S 505/924* (2013.01)

USPC ........... 505/211; 505/166; 505/430; 505/877; 505/924; 335/216; 335/299; 29/599

(58) Field of Classification Search
CPC ........... H01L 39/08; H01L 39/24; H01F 6/06; H01F 5/02; H01F 41/048; H01B 12/06; H02K 55/00; H02K 55/04
USPC ......... 505/163, 166, 211, 430, 434, 705, 877, 505/878, 879, 845, 924; 29/599, 605, 606; 174/125.1; 335/216, 299, 300; 310/40 R, 194, 201
See application file for complete search history.

(56) References Cited

U.S. PATENT DOCUMENTS 7,741,944 B2 *   6/2010  Leghissa et al. ............. 336/225
2002/0149453 A1 * 10/2002  Snitchler et al. ............. 335/182

FOREIGN PATENT DOCUMENTS

CN        1371519 A      9/2002
CN      101425728 A      5/2009
(Continued)

*Primary Examiner* — Stanley Silverman
*Assistant Examiner* — Kallambella Vijayakumar
(74) *Attorney, Agent, or Firm* — Drinker Biddle & Reath LLP (57) ABSTRACT

A superconducting coil and a rotating device, the performances of which are improved, and a superconducting coil manufacturing method are provided. A superconducting coil 10 is a saddle-shaped superconducting coil formed by winding a superconducting wire so as to form a race-track-like shape. The superconducting coil includes a curved portion 10*b* and a straight portion 10*a* connected to the curved portion 10*b*. In the curved portion 10*b*, an upper edge 10*c* is positioned closer to an inner peripheral side than a lower edge 10*d* is, and in the straight portion 10*a*, the upper edge 10*c* is positioned closer to an outer peripheral side than the lower edge 10*d* is.

3 Claims, 12 Drawing Sheets

(56) References Cited

FOREIGN PATENT DOCUMENTS

| | | | | |
|---|---|---|---|---|
| CN | 101431287 A | 5/2009 | | |
| JP | 41019269 | * 8/1966 | ............... | H01F 6/06 |
| JP | S41-019269 B | 11/1966 | | |
| JP | 57-160360 | 10/1982 | | |
| JP | S61-272903 | 12/1986 | | |
| JP | 7-79048 | 2/1988 | | |
| JP | 64-069259 | 3/1989 | | |
| JP | 1-176905 | 12/1989 | | |
| JP | 4-264704 | 9/1992 | | |
| JP | 04264704 | * 9/1992 | ............... | H01F 6/06 |
| JP | 08-066002 | 3/1996 | | |
| JP | 2006-332577 A | 12/2006 | | |
| JP | 2009-49040 | 3/2009 | | |
| JP | 2010-118457 | 5/2010 | | |
| WO | WO 2006/111527 A1 | 10/2006 | | |

* cited by examiner

SUPERCONDUCTING COIL, ROTATING DEVICE, AND SUPERCONDUCTING COIL MANUFACTURING METHOD

TECHNICAL FIELD

The present invention relates to a superconducting coil, a rotating device, and a superconducting coil manufacturing method.

BACKGROUND ART

A superconducting coil formed by winding a superconducting wire has been disclosed (for example, Japanese Examined Patent Application Publication No. 7-79048 (Patent Literature (PTL) 1)). PTL 1 discloses a method of connecting saddle-shaped superconducting magnet coils. PTL1 discloses connection of the saddle-shaped superconducting magnet coils by superposing an inner layer coil and an outer layer coil on each other, the inner and outer layer coils being formed by winding superconducting wires having sectional dimensions different from each other, and connecting the inner and the outer layer coils in series.

SUMMARY OF INVENTION

Technical Problem

Since the superconducting coils in the above-described PTL 1 are formed to have a saddle shape, bottom surfaces of coil ends (curved portions) are curved. With this structure, the bottom surfaces of the superconducting coils can be disposed along a cylindrical surface, and accordingly, the saddle-shaped superconducting coils can be disposed along the cylindrical surface.

However, in order to form the saddle-shaped superconducting coils, the superconducting wires each need to be wound such that the bottom surface of the coil end is curved. There is a direction in which the superconducting wire is easily bent (flatwise) and a direction in which the superconducting wire is not easily bent (edgewise). In order to produce the saddle-shaped superconducting coils disclosed in the above-described PTL 1, the superconducting wires need to be bent in the direction in which the superconducting wires are not easily bent. When the superconducting wires are bent in the direction in which the superconducting wires are not easily bent, the performance of the superconducting wires is degraded. Thus, there is a problem with the superconducting coils disclosed in the above-described PTL 1 in that the performance of the superconducting coils is degraded.

Accordingly, an object of the present invention is to provide a superconducting coil and a rotating device, the performances of which are improved, and a superconducting coil manufacturing method.

Solution to Problem

A superconducting coil according to the present invention is a saddle-shaped superconducting coil formed by winding a superconducting wire so as to form a race-track-like shape. The superconducting coil includes a curved portion and a straight portion connected to the curved portion. In the curved portion, an upper edge is positioned closer to an inner peripheral side than a lower edge, and in the straight portion, the upper edge is positioned closer to the outer peripheral side than the lower edge is.

In the superconducting coil according to the present invention, the superconducting wire is wound such that, in the curved portion, the upper edge is positioned closer to the inner peripheral side than the lower edge is, and in the straight portion, the upper edge is positioned closer to the outer peripheral side than the lower edge is. This allows the difference between the lengths of the upper edge and the lower edge to be decreased. Thus, application of force in a direction in which the superconducting wire is not easily bent (edgewise bending) to the superconducting wire can be suppressed. Accordingly, since degradation of the performance of the superconducting wire can be suppressed, degradation of the performance of the superconducting coil can be suppressed.

A rotating device according to the present invention includes the above-described superconducting coil. The rotating device according to the present invention uses the superconducting coil, of which degradation of the performance can be suppressed. Thus, degradation of the performance of the rotating device can be suppressed. Furthermore, since the superconducting coil has a saddle shape, the bottom portion (lower edge) of the superconducting coil can be disposed along a cylindrical surface of the rotating device. Thus, the size reduction can be possible.

A superconducting coil manufacturing method according to the present invention includes the steps of preparing a base having a cylindrical surface, arranging a race-track-like winding frame having a saddle shape on the cylindrical surface of the base, and winding a superconducting wire on the cylindrical surface of the base along the winding frame. The winding frame has a curved portion and a straight portion connected to the curved portion. In the curved portion, an upper edge is positioned closer to an inner peripheral side than a lower edge is, and in the straight portion, the upper edge is positioned closer to the outer peripheral side than the lower edge is.

With the superconducting coil manufacturing method according to the present invention, by winding the superconducting wire on the cylindrical surface of the base, a saddle shape can be formed. The superconducting wire is wound along the winding frame, in which, in the curved portion, the upper edge is positioned closer to the inner peripheral side than the lower edge is, and in the straight portion, the upper edge is positioned closer to the outer peripheral side than the lower edge is. Thus, the superconducting coil can be formed, in which, in the curved portion, the upper edge is positioned closer to the inner peripheral side than the lower edge is, and in the straight portion, the upper edge is positioned closer to the outer peripheral side than the lower edge is. Accordingly, the above-described superconducting coil, of which degradation of the performance is suppressed, can be manufactured.

Advantageous Effects of Invention

Thus, with the superconducting coil and the superconducting coil manufacturing method according to the present invention, in the curved portion, the upper edge is positioned closer to the inner peripheral side than the lower edge is, and in the straight portion, the upper edge is positioned closer to the outer peripheral side than the lower edge is, thereby permitting degradation of the performance to be suppressed.

DESCRIPTION OF EMBODIMENTS

Embodiments of the present invention will be described below with reference to the drawings. In the drawings referred to below, the same or equivalent elements are denoted by the same reference signs, and description thereof is not repeated. Dimensional ratios in the drawings do not necessarily match those of elements described below.

First Embodiment

Referring to FIGS. 1 to 10, a superconducting coil 10 according to an embodiment of the present invention is described. As illustrated in views (A) and (B) of FIG. 1 and FIG. 2, the superconducting coil 10 according to the present embodiment is a saddle-shaped superconducting coil formed by winding a superconducting wire 11 so as to form a race-track-like shape. That is, the superconducting coil 10 has a race-track-like shape seen from the top.

The superconducting coil 10 has straight portions 10a and curved portions 10b connected to the straight portions 10a. The straight portions 10a are liner portions that extend in the major axis direction, and the curved portions 10b are curved portions (coil end portions) seen from the top. As illustrated in view (B) of FIG. 1, the curved portions 10b each has a saddle shape. A lower edge 10d of the curved portions 10b serving as a bottom portion is curved to have an arc shape.

Figure 2:
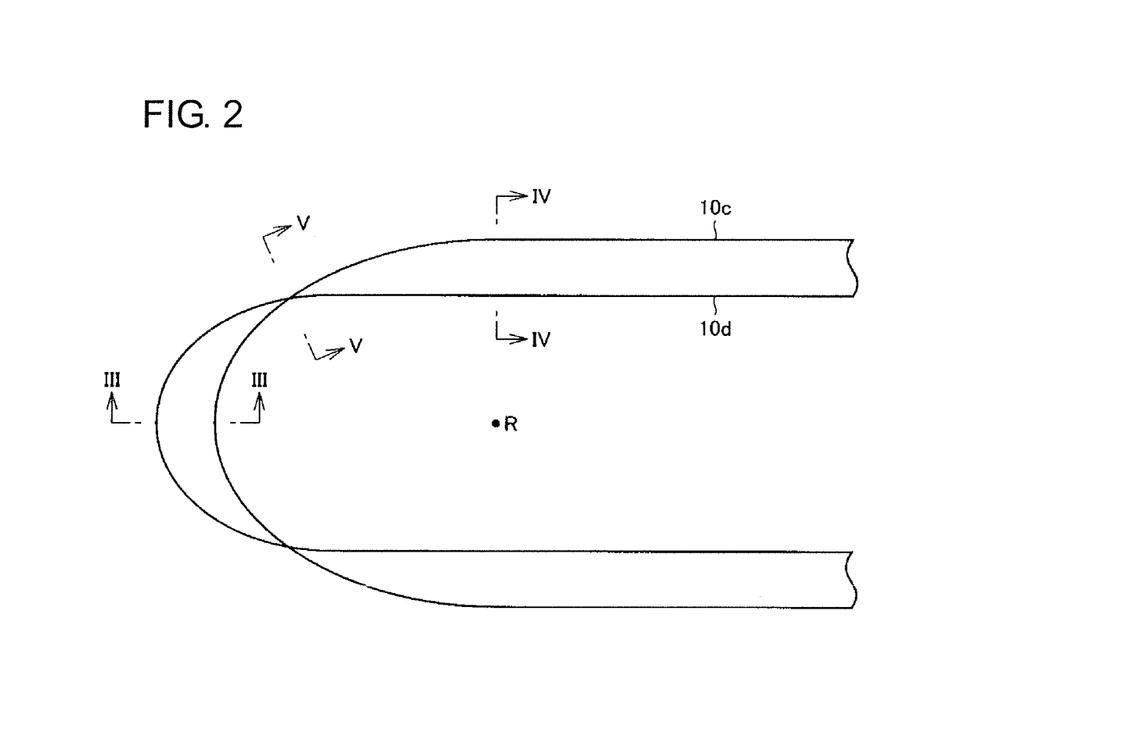
FIG. 2 is a schematic diagram schematically illustrating an upper edge and a lower edge of the superconducting coil according to the first embodiment of the present invention.

FIG. 2 illustrates a course along which an upper edge 10c is positioned and a course along which the lower edge 10d is positioned in a turn of the superconducting wire 11 that forms the superconducting coil 10, with other turns of the superconducting wire 11 or the like omitted. Also in FIG. 2, a center R indicates the center of an arc of each of the curved portions 10b of the superconducting wire 11.

Figure 3:
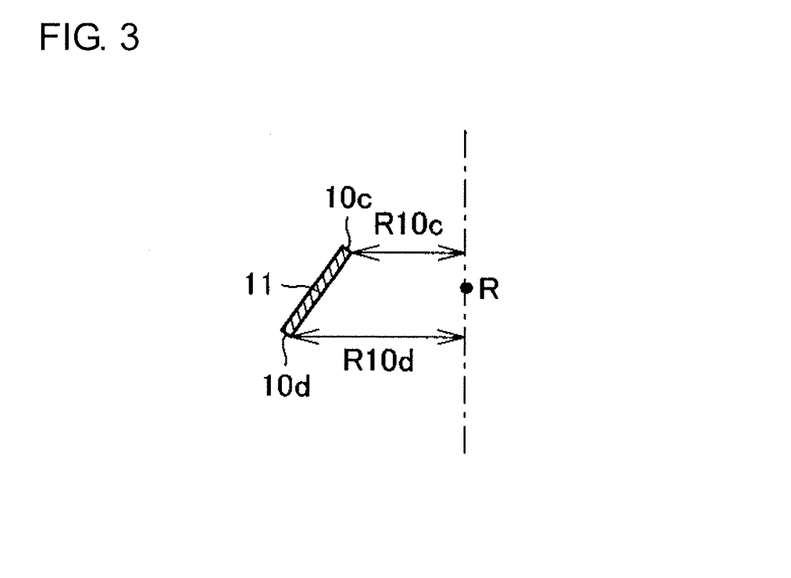
FIG. 3 is a schematic sectional view taken along line in FIG. 2.

As illustrated in FIGS. 2 and 3, in each of the curved portions 10b, the upper edge 10c is positioned closer to an inner peripheral side (a side on which a hollow surrounded by the superconducting coil 10 exists) than the lower edge 10d is. That is, in each of the curved portions 10b, a distance R10c between the upper edge 10c and the center R is smaller than a distance R10d between the lower edge 10d and the center R.

Figure 4:
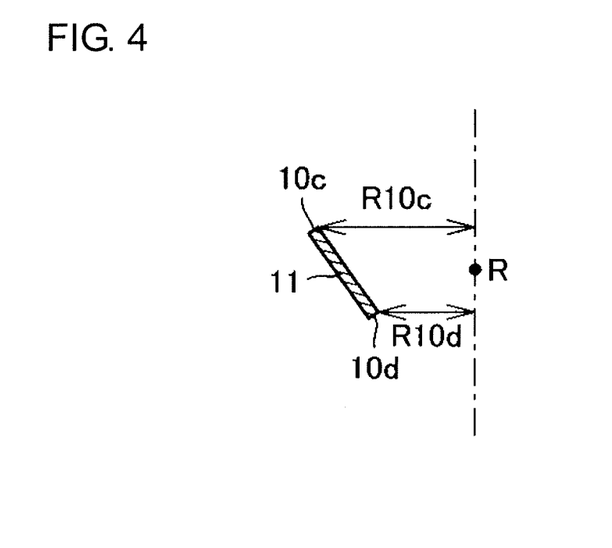
FIG. 4 is a schematic sectional view taken along line IV-IV in FIG. 2.

As illustrated in FIGS. 2 and 4, in each of the straight portions 10a, the upper edge 10c is positioned closer to an outer peripheral side (a side opposite to the side on which the hollow surrounded by the superconducting coil 10 exists) than the lower edge 10d is. That is, in each of the straight portions 10a, the distance R10c between the upper edge 10c and the center R is greater than the distance R10d between the lower edge 10d and the center R.

Figure 5:
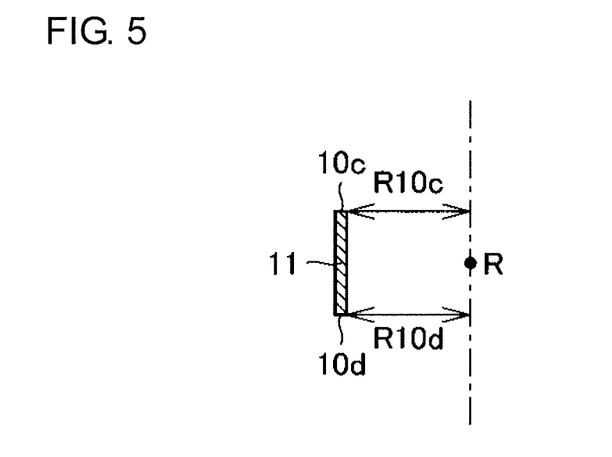
FIG. 5 is a schematic sectional view taken along line V-V in FIG. 2.

As illustrated in FIGS. 2 and 5, positions in which the upper edge 10c matches the lower edge 10d in a peripheral direction exist. In other words, a plane formed by the upper edge 10c and the lower edge 10d at any of these positions is parallel to the axis that passes through the center R. At each of these positions, the distance R10c between the upper edge 10c and the center R is the same as the distance R10d between the lower edge 10d and the center R. These positions may exist at positions where the straight portions 10a are connected to the curved portions 10b, or exist in the straight portions 10a or in the curved portions 10b.

Preferably, the length of the upper edge 10c is the same as the length of the lower edge 10d. In this case, the superconducting wire 11 is disposed such that inclination of the superconducting wire 11 gradually changes in the curved portions 10b.

Figure 6:
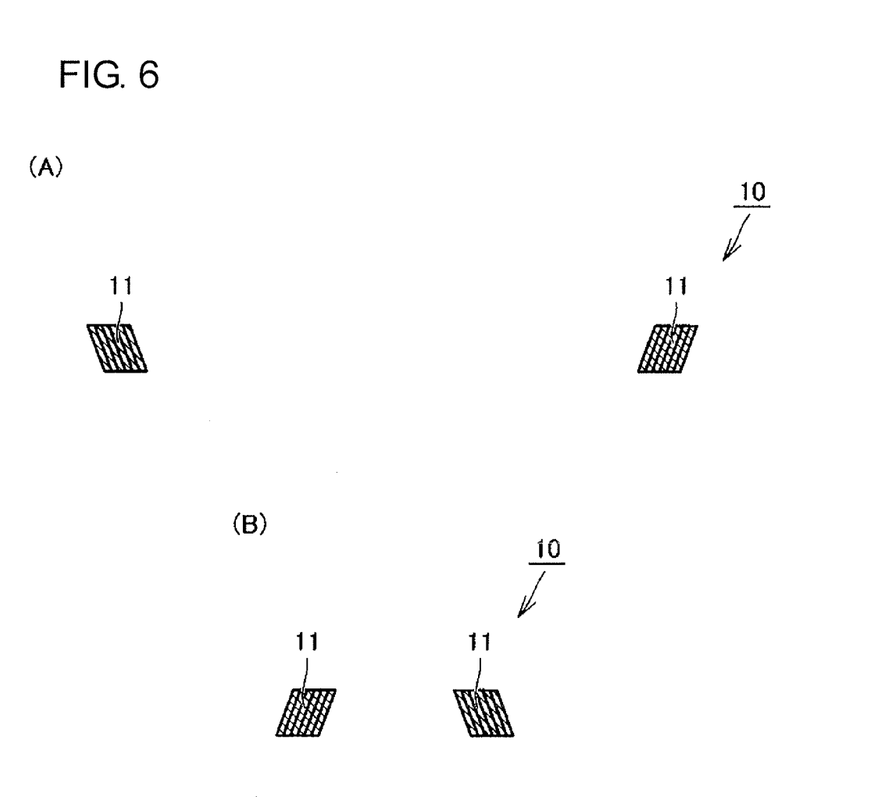
FIG. 6 schematically illustrates the superconducting coil according to the first embodiment of the present invention; view (A) of FIG. 6 is a schematic sectional view taken along line VI (A)-VI (A) in FIG. 1, and view (B) of FIG. 6 is a schematic sectional view taken along line VI (B)-VI (B) in FIG. 1.

When the superconducting wire 11 is disposed in such a manner, as illustrated in views (A) and (B) of FIG. 6, directions in which the superconducting wire 11 is inclined are opposing to each other between the lengthwise direction and the widthwise direction of the superconducting coil 10.

The above-described upper edge 10c and the lower edge 10d appear in the case where the superconducting coil 10 is placed on a flat plane. Thus, when the superconducting coil 10 is placed in a state opposite to a state illustrated in FIG. 1, (placed with the upper edge 10c on the lower side and the lower edge 10d on the upper side), in each of the curved portions, the upper edge is positioned closer to the outer peripheral side than the lower edge is and in each of the straight portions, the upper edge is positioned closer to the inner peripheral side than the lower edge is.

Here, the superconducting wire 11 that forms the superconducting coil 10 is described. The superconducting wire 11 is a tape-shaped wire and may use a bismuth (Bi)-based superconducting wire 11 as illustrated in FIG. 7, or a thin film superconducting wire 11 as illustrated in FIG. 8.

Figure 7:
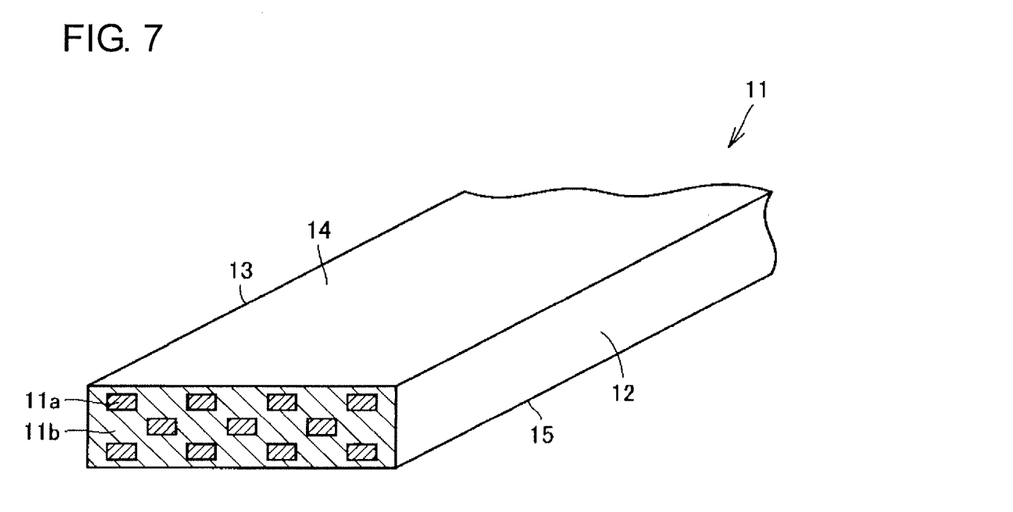
FIG. 7 is a perspective view schematically illustrating a bismuth (Bi)-based superconducting wire according to the first embodiment of the present invention.

As illustrated in FIG. 7, the bismuth-based superconducting wire 11 has a plurality of superconducting materials 11a and a sheath portion 11b. The superconducting materials 11a extend in the lengthwise direction, and the sheath portion 11b covers the entire peripheries of the plurality of superconducting materials 11a. The sheath portion 11b is in contact with the superconducting materials 11a. Preferably, each of the plurality of superconducting materials 11a is a bismuth-based superconducting material having a composition of, for example, Bi—Pb—Sr—Ca—Cu—O base. In particular, a material including a Bi2223 phase, whose atomic ratio of (bismuth and lead):strontium:calcium:copper is approximately expressed as a ratio about 2:2:2:3, is optimum. The sheath portion 11b is formed of, for example, silver or a silver alloy. The superconducting wire 11 may include a single superconducting material 11a.

Figure 8:
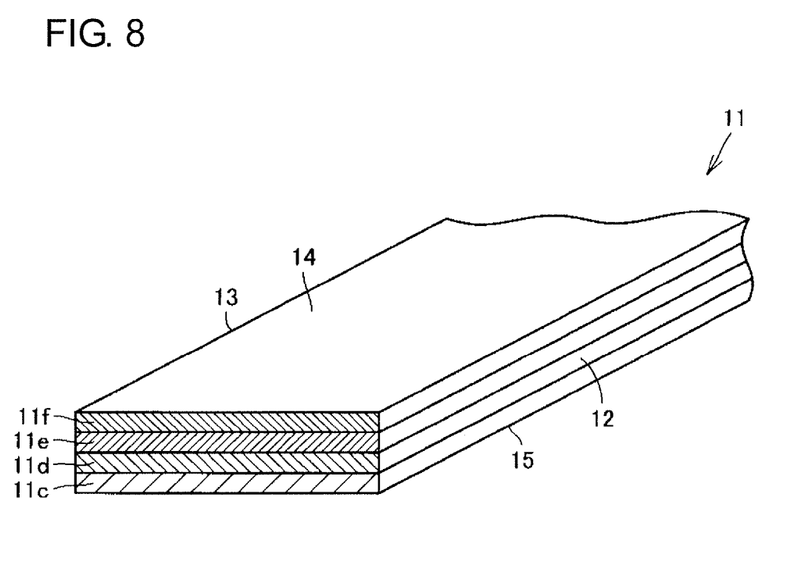
FIG. 8 is a perspective view schematically illustrating a thin film superconducting wire according to the first embodiment of the present invention.

As illustrated in FIG. 8, the thin film superconducting wire 11 has a substrate 11c, an intermediate layer 11d, a superconducting layer 11e, and a stabilizing layer 11f. The intermediate layer 11d is formed on and in contact with the substrate 11c. The superconducting layer 11e is formed on and in contact with the intermediate layer 11d. The stabilizing layer 11f is formed on and in contact with the superconducting layer 11e.

The substrate 11c is formed of metal such as, for example, stainless steel, a nickel alloy (for example, Hastelloy), or a silver alloy. The intermediate layer 11d is formed of, for example, yttria stabilized zirconia, ceric oxide, magnesium oxide, strontium titanate, or the like. The intermediate layer 11d may be omitted.

The superconducting layer 11e is formed of, for example, a rare earth (RE) 123-based superconducting material. The RE123-based superconducting material means that, in $RE_xBa_yCu_zO_{7-d}$, $0.7 \leq x \leq 1.3$, $1.7 \leq y \leq 2.3$, and $2.7 \leq z \leq 3.3$. RE of the RE123-based superconducting material refers to a material that includes at least either of a rare earth element and an yttrium element. The rare earth element may be, for example, neodymium (Nd), gadolinium (Gd), holmium (Ho) or samarium (Sm). The RE123-based superconducting wires have advantages in that the critical current density thereof at the liquid nitrogen temperature (77.3 K) is higher than that of bismuth-based superconducting wires, and the critical-current value thereof at low temperature or under a certain magnetic field is high. However, unlike bismuth-based superconducting materials, the RE123 superconducting materials cannot be covered by sheath portions, and accordingly, are fabricated by depositing a superconducting material (superconducting thin film material) using only a gas phase method or only a liquid phase method on a textured metal substrate.

The stabilizing layer 11f is provided in order to protect a surface of the superconducting layer 11e and formed of, for example, silver or copper. The stabilizing layer 11f may be omitted.

Figure 1:
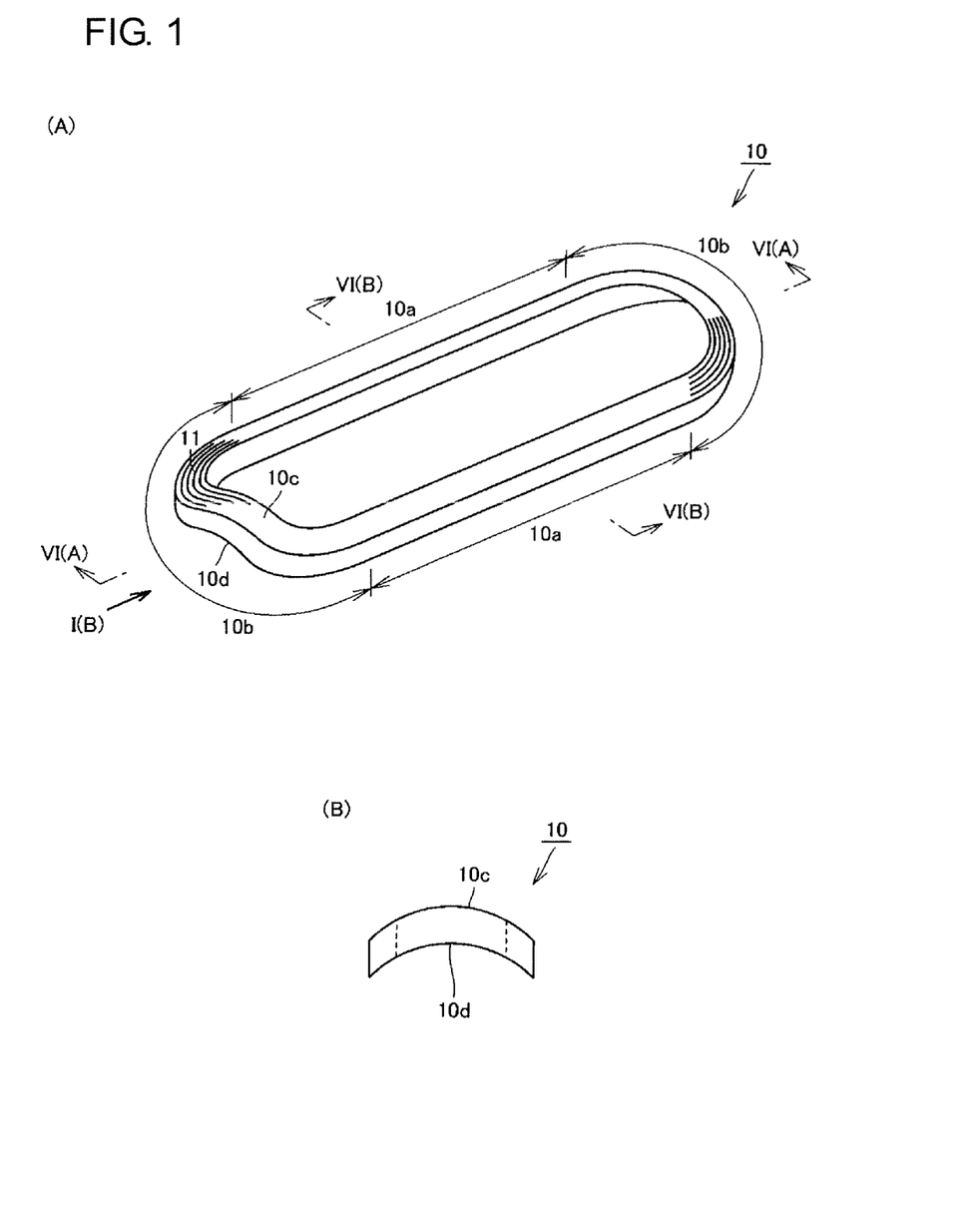
FIG. 1 schematically illustrates a superconducting coil according to a first embodiment of the present invention; view (A) of FIG. 1 is a perspective view, view (B) of FIG. 1 is a side view seen from an arrow I (B) direction in FIG. 1A.

As illustrated in FIGS. 7 and 8, when the superconducting wire 11 is wound so as to form a race-track-like shape as illustrated in FIG. 1, the superconducting wire 11 has an upper surface 12 positioned on the upper edge 10c, a lower surface 13 positioned on the lower edge 10d, and side surfaces 14 and 15. The superconducting wire 11 illustrated in FIG. 8 may be wound with the upper and lower surfaces inverted. When the superconducting layer 11e is located on the inner peripheral side, a situation in which compressive stress is applied to the superconducting layer 11e can be suppressed. This is advantageous because degradation of the superconducting layer 11e can be suppressed. When the superconducting layer 11e is located on the outer side, the advantage is that terminals connected to an external power source can be easily provided.

Figure 9:
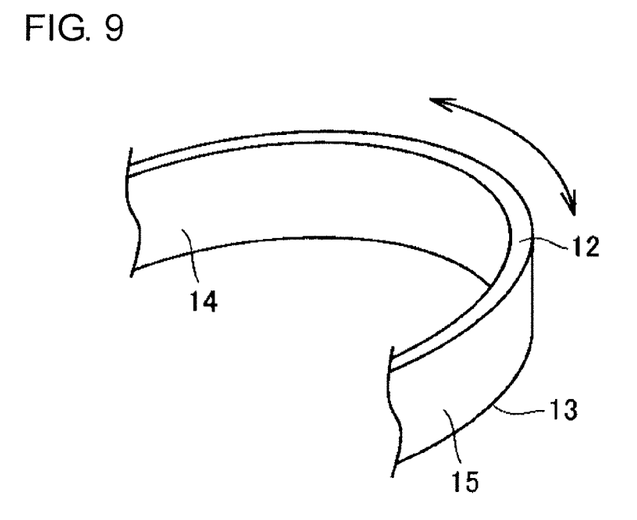
FIG. 9 illustrates a flatwise direction of the superconducting wire according to the first embodiment of the present invention.

As illustrated in FIG. 9, each curved portion 10b illustrated in FIG. 1 can be formed by bending the superconducting wire 11 such that the side surface 14 extending in one lengthwise direction is positioned on the inner peripheral side and the side surface 15 extending in the other lengthwise direction is positioned on the outer peripheral side (in a directions indicated by an arrow in FIG. 9). The superconducting wire 11 is easily bent in these directions (flatwise).

Figure 10:
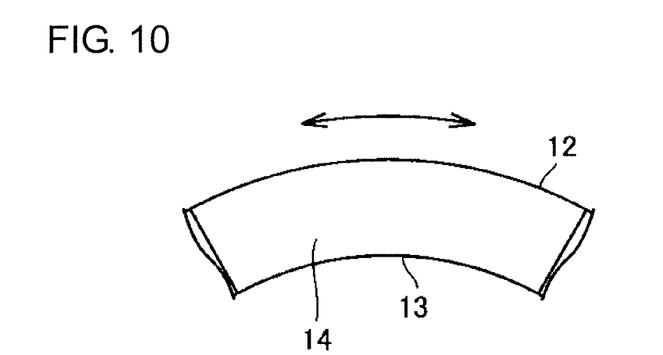
FIG. 10 illustrates an edgewise direction of the superconducting wire according to the first embodiment of the present invention.

As illustrated in FIG. 10, by bending the superconducting wire 11 such that the lower surface 13 positioned on the lower edge 10d in FIG. 1 is bent along an arc shape (in a direction indicated by an arrow in FIG. 10), a saddle shape can be shaped. The superconducting wire 11 is not easily bent in these directions (edgewise).

Figure 11:
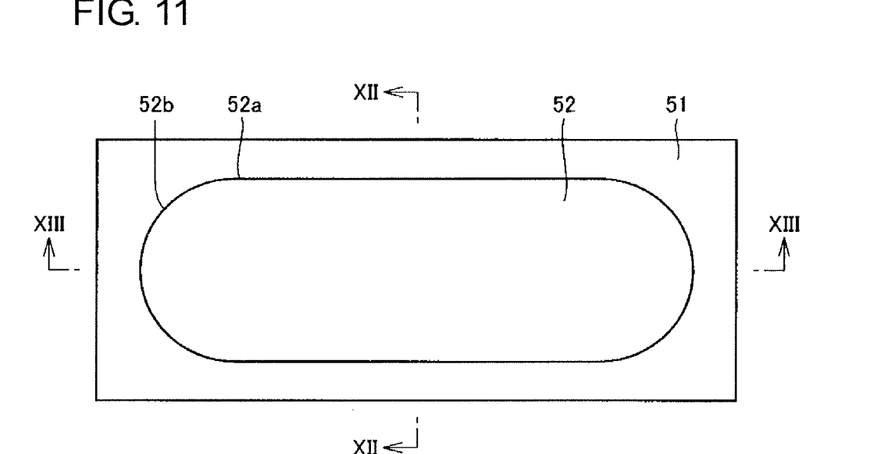
FIG. 11 is a top view schematically illustrating a device used to manufacture the superconducting coil according to the first embodiment of the present invention.
Figure 12:
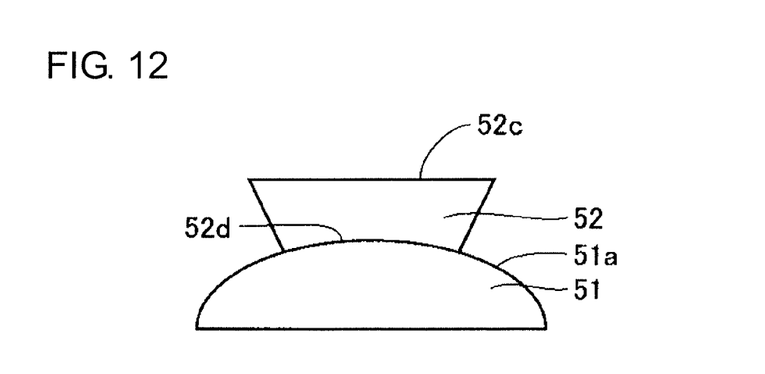
FIG. 12 is a schematic sectional view taken along line XII-XII in FIG. 11.
Figure 13:
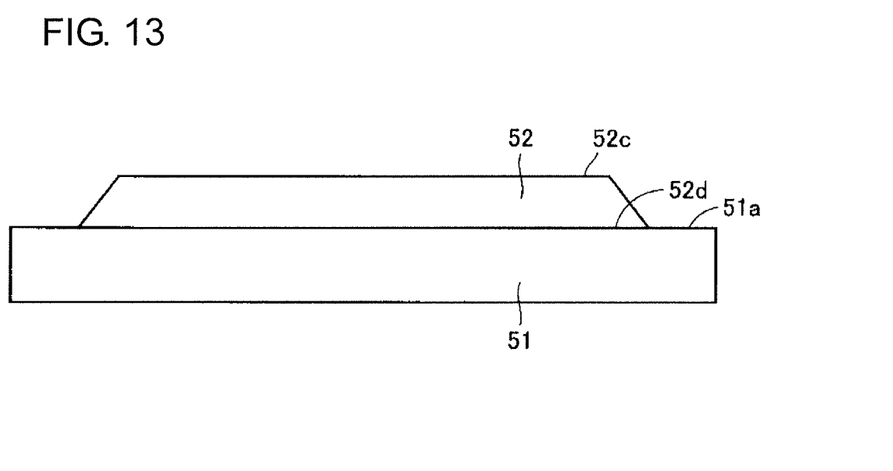
FIG. 13 is a schematic sectional view taken along line XIII-XIII in FIG. 11.

Referring next to FIGS. 11 to 13, a superconducting coil 10 manufacturing method according to the present embodiment is described. As illustrated in FIGS. 11 to 13, a base 51 having a cylindrical surface is initially prepared.

Then, a race-track-like winding frame 52 having a saddle shape is disposed on a cylindrical surface 51a of the base 51. The winding frame 52 has curved portions 52b and straight portions 52a connected to the curved portions 52b. In each of the curved portions 52b, an upper edge 52c is positioned closer to an inner peripheral side than a lower edge 52d is. In each of the straight portions 52a, the upper edge 52c is positioned closer to an outer peripheral side than the lower edge 52d is.

Next, the superconducting wire 11 is wound along the winding frame 52 and on the cylindrical surface 51a of the base 51. By winding the superconducting wire 11 on the cylindrical surface 51a, the saddle shape can be formed. By winding the superconducting wire 11 along the winding frame 52, edgewise bending of the superconducting wire 11 can be suppressed.

By performing the above-described steps, the superconducting coil 10 according to the present embodiment illustrated in FIG. 1 can be manufactured. By manufacturing the superconducting coil 10 in the above-described manner, compared to a case where the superconducting coil 10 is formed to have the saddle shape by pressing, cracks occurring in the superconducting wire 11 after the superconducting wire 11 has been wound to have a race-track-like shape can be suppressed.

Figure 14:
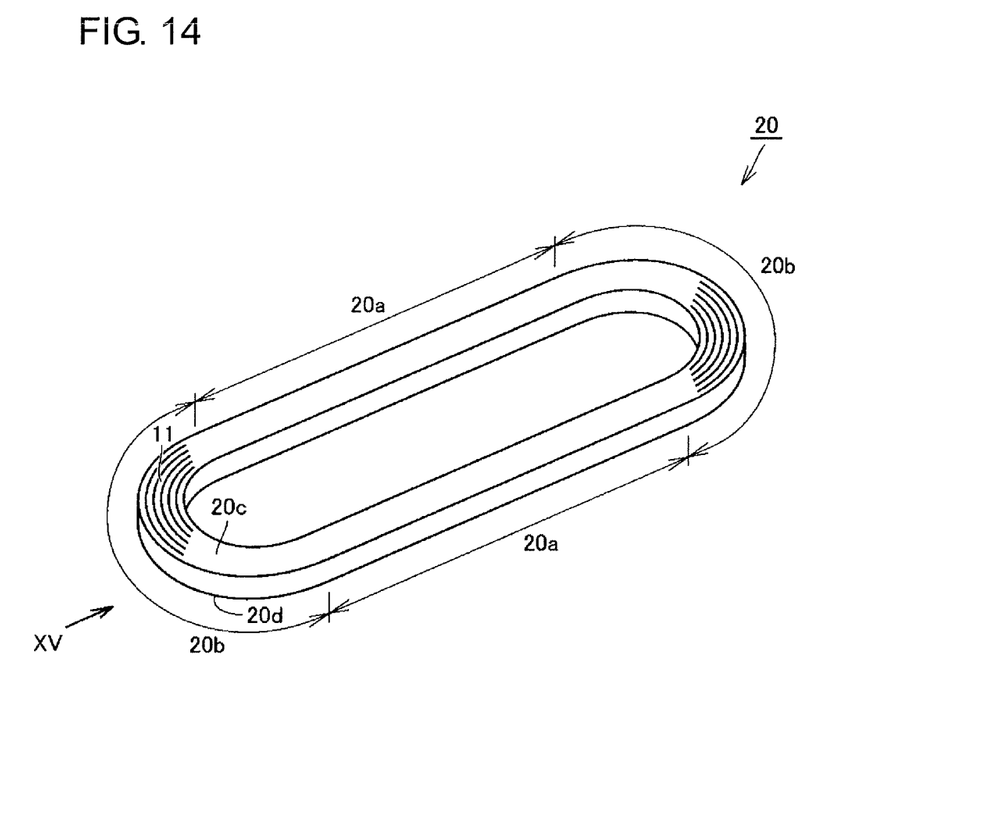
FIG. 14 is a perspective view schematically illustrating a superconducting coil of a first comparative example.
Figure 15:
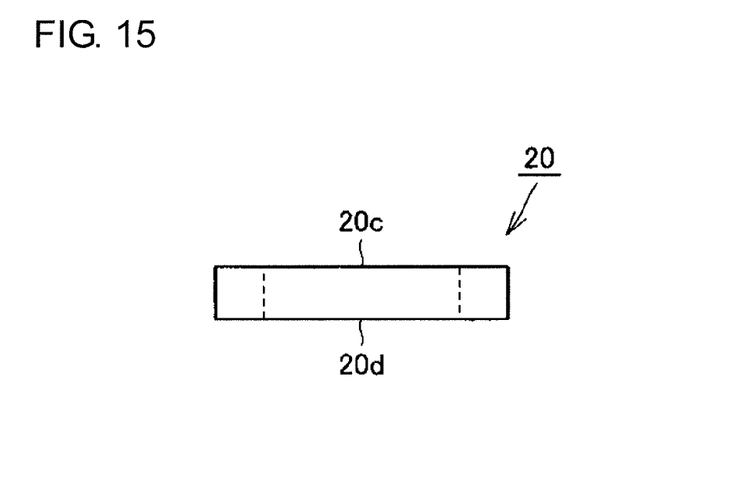
FIG. 15 is a plan view schematically illustrating the superconducting coil of the first comparative example.
Figure 16:
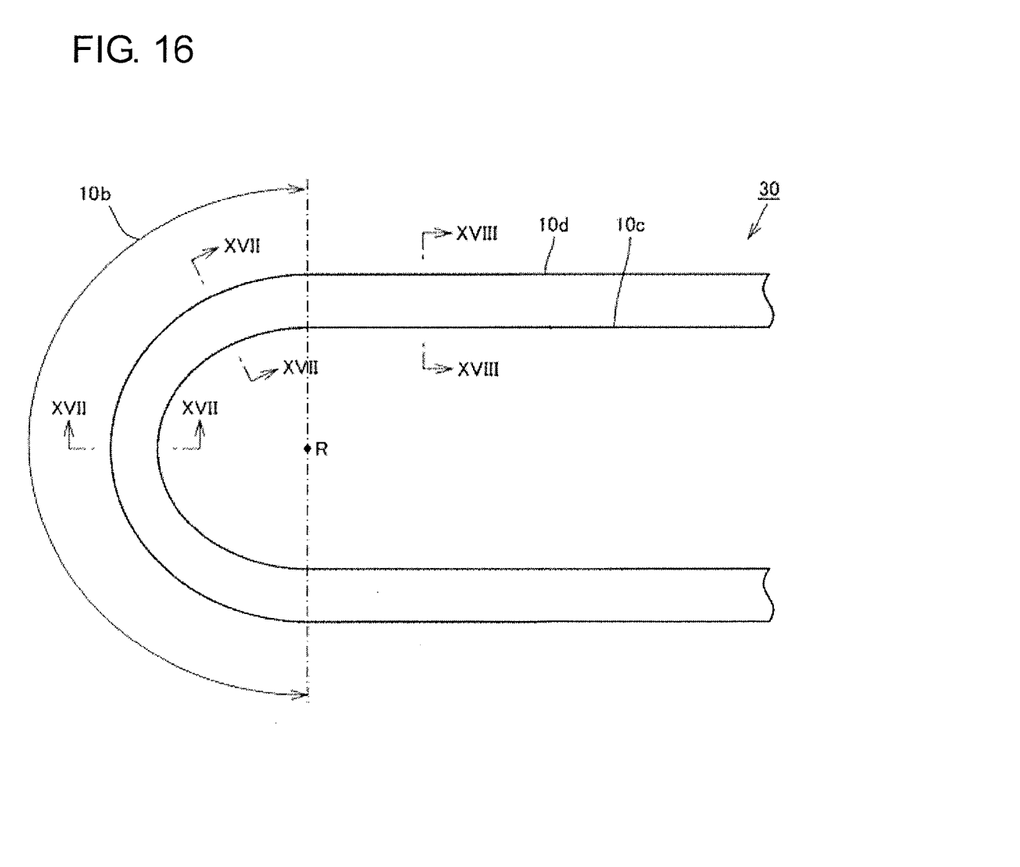
FIG. 16 is a schematic diagram illustrating an upper edge and a lower edge of a superconducting coil of a second comparative example.
Figure 17:
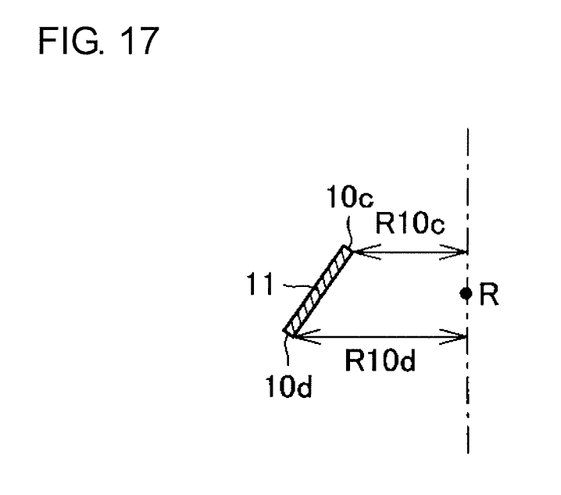
FIG. 17 is a schematic sectional view of a curved portion on the same radial directions of a circle centered at R as FIG. 16 taken along line XVII-XVII.
Figure 18:
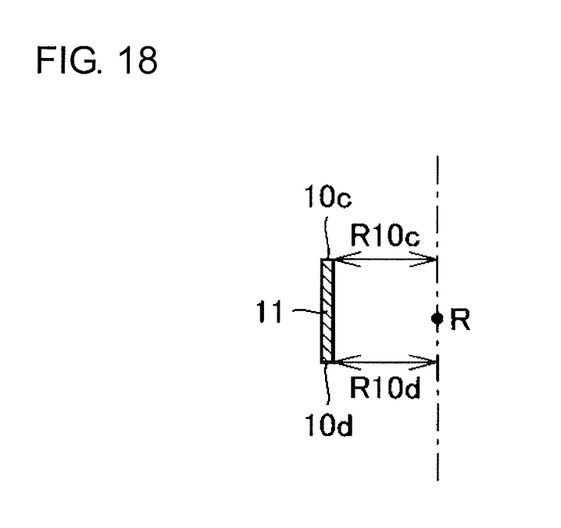
FIG. 18 is a schematic sectional view taken along line XVIII-XVIII in FIG. 16.

Next, advantages of the superconducting coil 10 according to the present embodiment are described by comparing it with a superconducting coil 20 of a first comparative example illustrated in FIGS. 14 and 15 and a superconducting coil 30 of a second comparative example illustrated in FIGS. 16 to 18.

As illustrated in FIGS. 14 and 15, the superconducting coil 20 of the first comparative example has a race-track-like shape having straight portions 20a and curved portions 20b, which do not have a saddle shape. That is, as illustrated in FIG. 15, which is a side view seen from an arrow XV in FIG. 14, an upper edge 20c and a lower edge 20d are flat in the curved portions 20b. Since the superconducting coil 20 of the first comparative example cannot be disposed along a cylindrical surface, there is a problem in that size reduction cannot be realized.

In the race-track-like shape superconducting coil 20 of the first comparative example, side surfaces of the superconducting wire 11 and the central axis of an arc in each of the curved portions are parallel to each other. Thus, force of edgewise bending applied to the curved portions can be suppressed.

FIG. 16 illustrates a course along which the upper edge 10c is positioned and a course along which the lower edge 10d is positioned in a turn of the superconducting wire 11 that forms the superconducting coil 10, with other turns of the superconducting wire 11 or the like omitted. Also in FIG. 16, the center R indicates the center of the arc of each of the curved portions of the superconducting wire 11.

As illustrated in FIGS. 16 to 18, the superconducting coil 30 of the second comparative example has a race-track-like shape having straight portions and curved portions as is the case with the first comparative example. The curved portions of the second comparative example have a saddle shape. As illustrated in FIG. 17, in the curved portions, the upper edge 10c of the superconducting wire 11 is positioned closer to the inner peripheral side than the lower edge 10d of the superconducting wire 11 is. That is, in each of the curved portions, the distance R10c between the upper edge 10c and the center R is smaller than the distance R10d between the lower edge 10d and the center R. As illustrated in FIG. 18, in each of the straight portions, the position of the upper edge 10c of the superconducting wire 11 matches the position of the lower edge 10d of the superconducting wire 11 in the peripheral direction. That is, the distance R10c between the upper edge 10c and the center R is the same as the distance R10d between the lower edge 10d and the center R. Thus, in the superconducting wire 11 included in the superconducting coil 30 of the second comparative example, the length of a portion of the superconducting wire 11 passing through the lower edge 10d is greater than that passing through the upper edge 10c.

In order to form a saddle shape with such a superconducting coil 30 of the second comparative example, as described above, the side surfaces 14 and 15 of the superconducting wire 11 need to be inclined in the curved portions 10b as illustrated in FIGS. 16 to 18. In other words, in each of the curved portions, the side surfaces of the superconducting wire 11 need to be inclined relative to the central axis of the arc. In this case, the superconducting wire 11 is maintained in a state in which force of edgewise bending is applied to the superconducting wire 11. Thus, although the superconducting coil 30 of the second comparative example can be disposed along the cylindrical surface, there is a problem in that the performance of the superconducting wire 11 is degraded.

In the superconducting coil 10 according to the present embodiment, the superconducting wire 11 is wound such that, in each of the curved portions 10b, the upper edge 10c is positioned closer to the inner peripheral side than the lower edge 10d is, and in each of the straight portions 10a, the upper edge 10c is positioned closer to the outer peripheral side than the lower edge 10d is. This allows the difference between the lengths of the upper edge 10c of the superconducting coil 10 and the lower edge 10d of the superconducting coil 10 to be decreased. Thus, application of force to the superconducting wire 11 in a direction in which the superconducting wire 11 is not easily bent (edgewise bending) can be suppressed. That is, inclination of the side surfaces 14 and 15 of the superconducting wire 11 is gradually changed in the curved portions 10b so as to cancel out the edgewise bending component. Accordingly, since degradation of the performance of the superconducting wire 11 can be suppressed, degradation of the performance of the superconducting coil 10 can be suppressed.

Furthermore, since the curved portions 10b have a saddle shape, the superconducting coil 10 can be disposed along a cylindrical surface. Accordingly, when the superconducting coil 10 according to the present embodiment is used in a rotating device, the size of the rotating device can be reduced.

Thus, with the superconducting coil 10 according to the present embodiment, both the following advantages of the first and second comparative examples can be obtained: the advantage obtained with the race-track-like superconducting coil 20 of the first comparative example not having a saddle shape, the advantage being an advantage in that the superconducting properties can be maintained; and the advantage of the second comparative example having a saddle shape, the advantage being an advantage in that arrangement along a cylindrical surface is possible.

Second Embodiment

Figure 19:
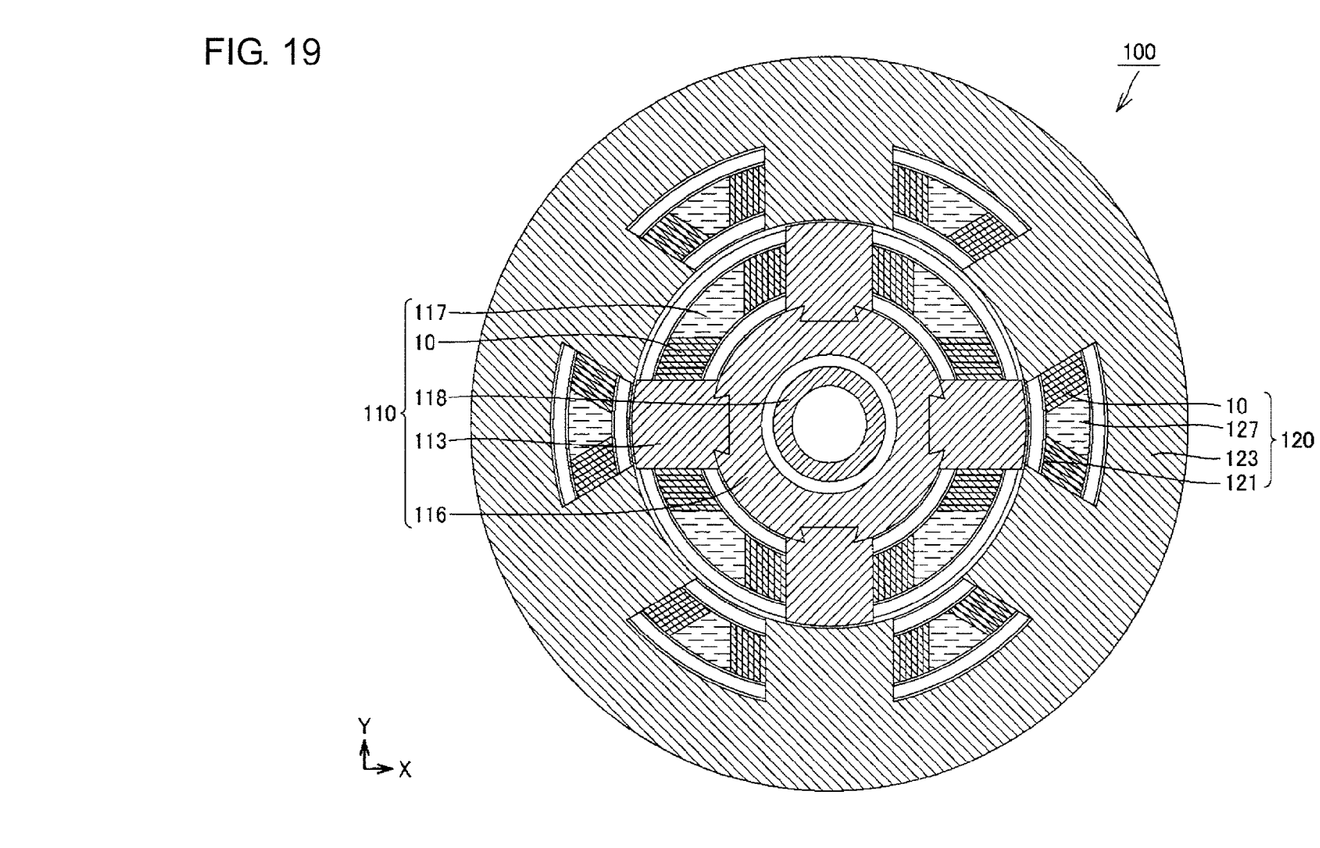
FIG. 19 is a sectional view schematically illustrating a motor according to a second embodiment of the present invention.
Figure 20:
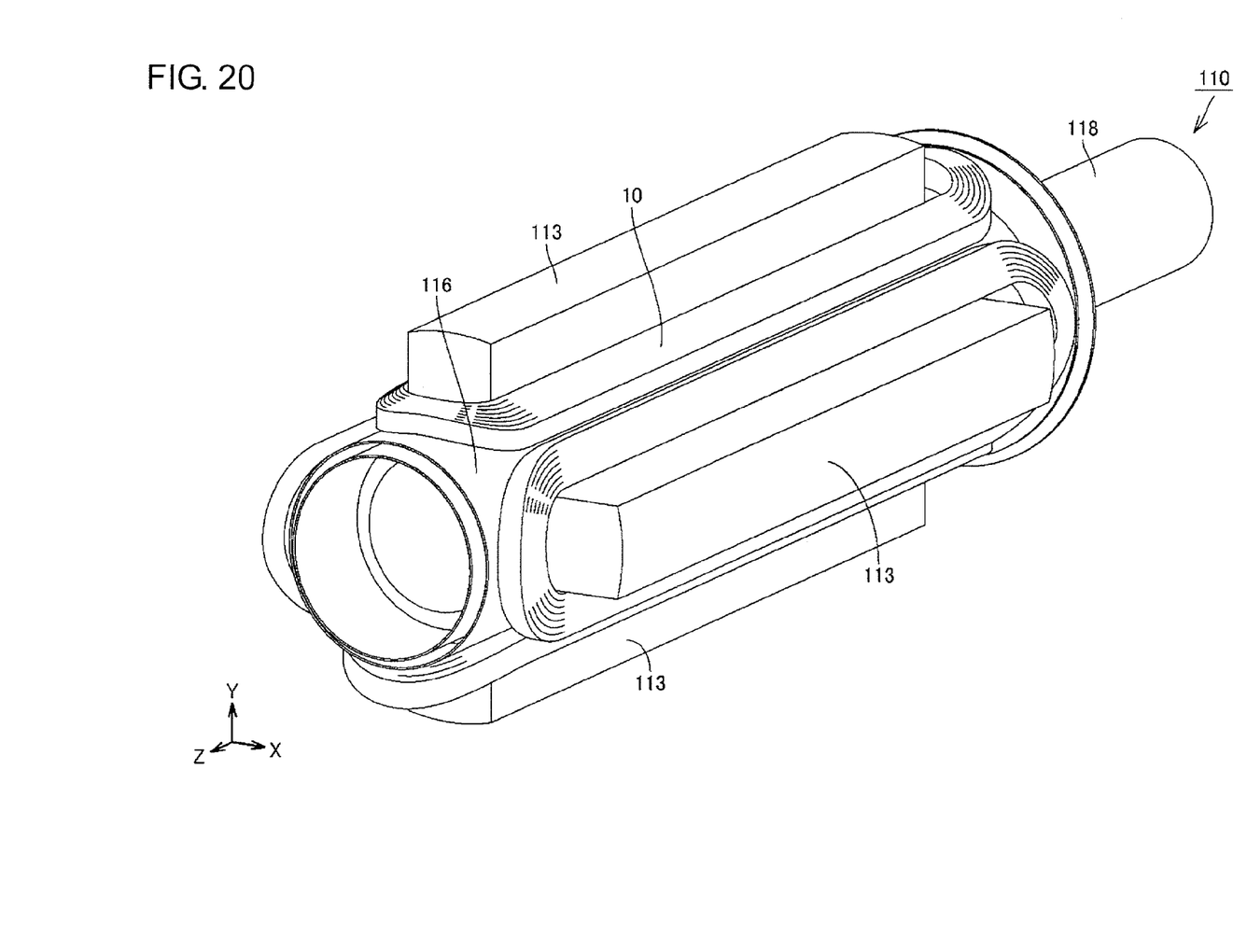
FIG. 20 is a perspective view schematically illustrating a rotor according to the second embodiment of the present invention.
Figure 21:
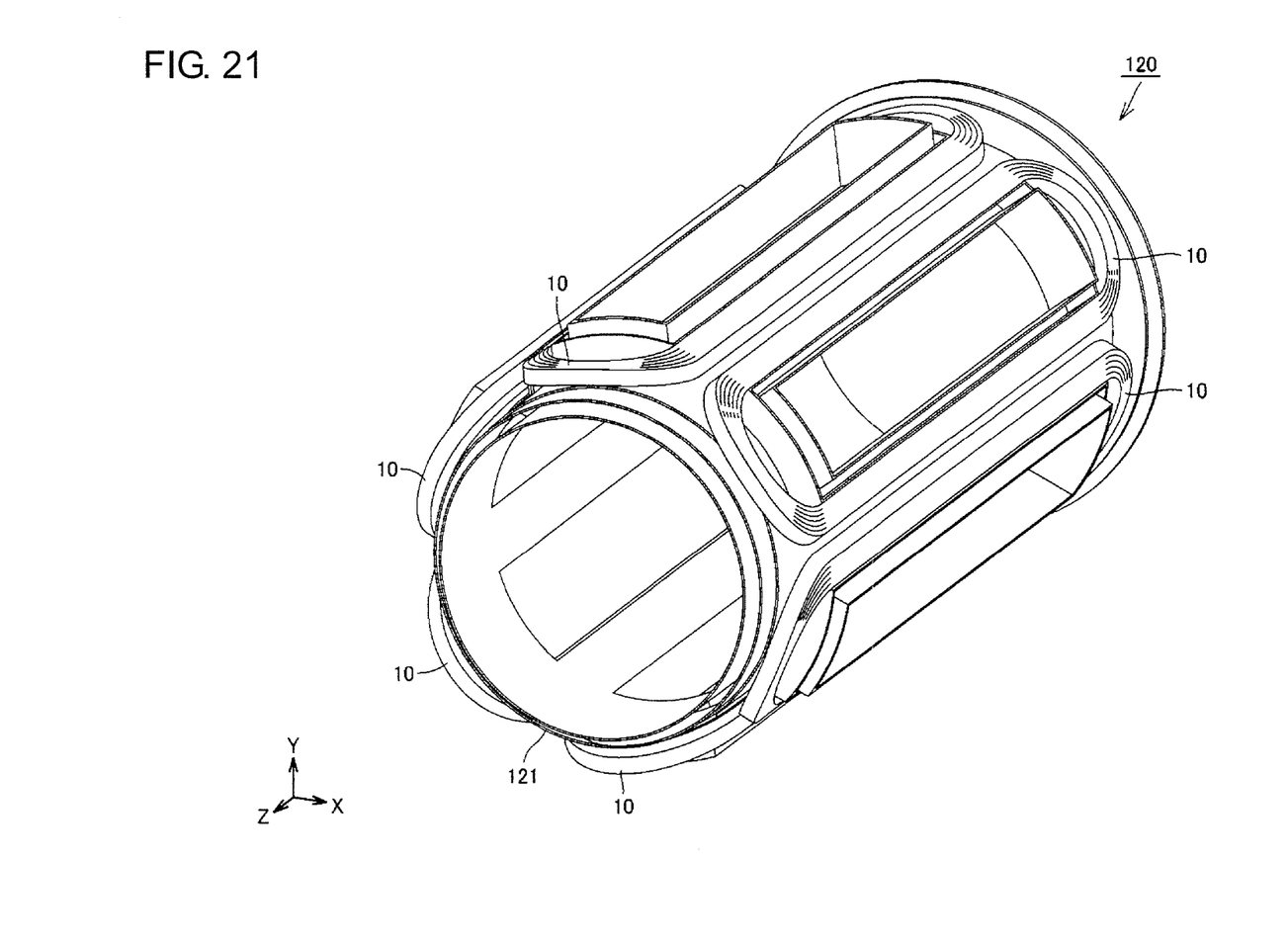
FIG. 21 is a perspective view schematically illustrating a stator according to the second embodiment of the present invention.

Referring to FIGS. 19 to 21, a motor 100 according to an embodiment of a rotating device of the present invention is described. As illustrated in FIG. 19, the motor 100 includes a rotor 110 as a rotating element and a stator 120 as a stationary element. The stator 120 is disposed around the rotor 110.

As illustrated in FIGS. 19 and 20, the rotor 110 includes the superconducting coils 10 of the first embodiment, a rotation shaft 118, rotor cores 113, a rotor shaft 116, and a refrigerant 117.

The rotor shaft 116 is formed around an outer peripheral surface of the rotation shaft 118, the outer peripheral surface extending in the major axis direction of the rotation shaft 118. An outer surface of the rotor shaft 116 has an arc shape. The rotor cores 113 radially extend from a central portion in a section of the rotor shaft 116 (region where the rotation shaft 118 is disposed), the section intersecting the rotation shaft 118, so as to protrude from the outer peripheral surface of the rotor shaft 116. The superconducting coils 10 are each disposed so as to surround a corresponding one of the rotor cores 113 along an arc-shaped outer surface of the rotor shaft 116. The refrigerant 117 cools the superconducting coils 10. The superconducting coils 10 and the refrigerant 117 are disposed in a heat-insulating container.

The stator 120 as the stationary element of the motor 100 is formed around the rotor 110. The stator 120 includes the superconducting coils 10 of the first embodiment, a stator yoke 121, a refrigerant 127, and a stator core 123.

The stator yoke 121 surrounds an outer periphery of the rotor cores 113. An outer surface of the stator yoke 121 has an arc shape. The superconducting coils 10 are disposed along the arc-shaped outer surface of the stator yoke 121. The refrigerant 127 cools the superconducting coils 10. The superconducting coils 10 and the refrigerant 127 are disposed in a heat-insulating container. The heat insulating container has openings in the central portions of the superconducting coils 10 so that portions of the stator core 123 are disposed therein. The stator core 123 is disposed so as to surround the superconducting coils 10 and extend through the central portions of the superconducting coils 10. Illustration of the stator core 123 is omitted from FIG. 21.

In the present embodiment, although four superconducting coils 10 of the rotor 110 and four portions of the rotor cores 113 extending through the central portions of the superconducting coils 10 are provided, an arbitrary number of rotor cores 113, for example, six, eight, or three rotor cores 113, may be provided. Likewise in the present embodiment, although six superconducting coils 10 of the stator 120 and six portions of the stator core 123 extending through the central portions of the superconducting coils 10 are provided, an arbitrary number of superconducting coils 10 and portions of the stator core 123, for example, four, eight, or three superconducting coils 10 and four, eight, or three portions of the stator core 123, may be provided.

As described above, the motor 100 as the rotating device according to the present embodiment includes the superconducting coils 10 according to the first embodiment. That is, the superconducting coils, of which degradation of the performance can be suppressed, are used. Thus, degradation of the performance of the motor 100 can be suppressed. Furthermore, since each superconducting coil 10 has a saddle shape, the bottom portion (lower edge) of the superconducting coil 10 can be disposed along a cylindrical surface. Thus, the size of the motor 100 can be reduced.

In the present embodiment, the motor 100 including the rotor 110 and the stator 120 is described as an example of the rotating device. However, the rotating device according to the present invention is not limited to the motor, and is applicable to, for example, a generator or the like.

The embodiments disclosed herein are exemplary in every aspect and should be understood as non-limiting. It is intended that the scope of the present invention is defined not by the foregoing embodiments but by the scope of the claims, and any modification within the scope of the claims or equivalent in meaning to the scope of the claims is included in the scope of the present invention.

INDUSTRIAL APPLICABILITY

The present invention is preferably used for a superconducting coil and a rotating device, the performances of which are improved, and a superconducting coil manufacturing method.

REFERENCE SIGNS LIST

10, 20, 30 superconducting coil
10a, 20a, 52a straight portion
10b, 20b, 52b curved portion
10c, 20c, 52c upper edge
10d, 20d, 52d lower edge
11 superconducting wire, 11a superconducting material, 11b sheath portion, 11c substrate, 11d intermediate layer, 11e superconducting layer, 11f stabilizing layer, 12 upper surface, 13 lower surface, 14, 15 side surface base, 51a cylindrical surface, 52 winding frame
100 motor, 110 rotor, 113 rotor core, 116 rotor shaft, 117, 127 refrigerant, 118 rotation shaft, 120 stator, 121 stator yoke, 123 stator core
R center, R10c, R10d distance

CITATION LIST

Patent Literature

PTL1: Japanese Examined Patent Application Publication No. 7-79048

The invention claimed is:

1. A saddle-shaped superconducting coil formed by winding a superconducting wire so as to form a race-track-like shape, the superconducting coil comprising:
    a curved portion; and
    a straight portion connected to the curved position,
    wherein, in the curved portion, an upper edge is positioned closer to an inner peripheral side than a lower edge is,
    wherein, in the straight portion, the upper edge is positioned closer to the outer peripheral side than the lower edge is, and
    wherein an inclination of side surfaces of the superconducting coil gradually changes between the curved portion and the straight portion so as to cancel out an edgewise bending component and so that a length of the upper edge is the same as a length of the lower edge.

2. A rotating device comprising:
    the superconducting coil according to claim 1.

3. A superconducting coil manufacturing method comprising the steps of:
    preparing a base having a cylindrical surface;
    arranging a race-track-like winding frame having a saddle shape on the cylindrical surface of the base; and
    winding a superconducting wire on the cylindrical surface of the base along the winding frame,
    wherein the winding frame has a curved portion and a straight position connected to the curved portion,
    wherein, in the curved portion, an upper edge is positioned closer to an inner peripheral side than a lower edge is, and in the straight position, the upper edge is positioned closer to the outer peripheral side than the lower edge is, and
    wherein an inclination of side surfaces of the winding frame gradually changes between the curved portion and the straight portion so as to cancel out an edgewise bending component and so that a length of the upper edge is the same as a length of the lower edge.

* * * * *